March 26, 1963 A. VOIGT 3,082,655
WIRE STRAIGHTENING AND CUT-OFF MACHINES
Filed Jan. 8, 1960 4 Sheets-Sheet 1

INVENTOR
ALFRED VOIGT

BY
ATTORNEYS

March 26, 1963 A. VOIGT 3,082,655
WIRE STRAIGHTENING AND CUT-OFF MACHINES
Filed Jan. 8, 1960 4 Sheets-Sheet 2

INVENTOR
ALFRED VOIGT
ATTORNEYS

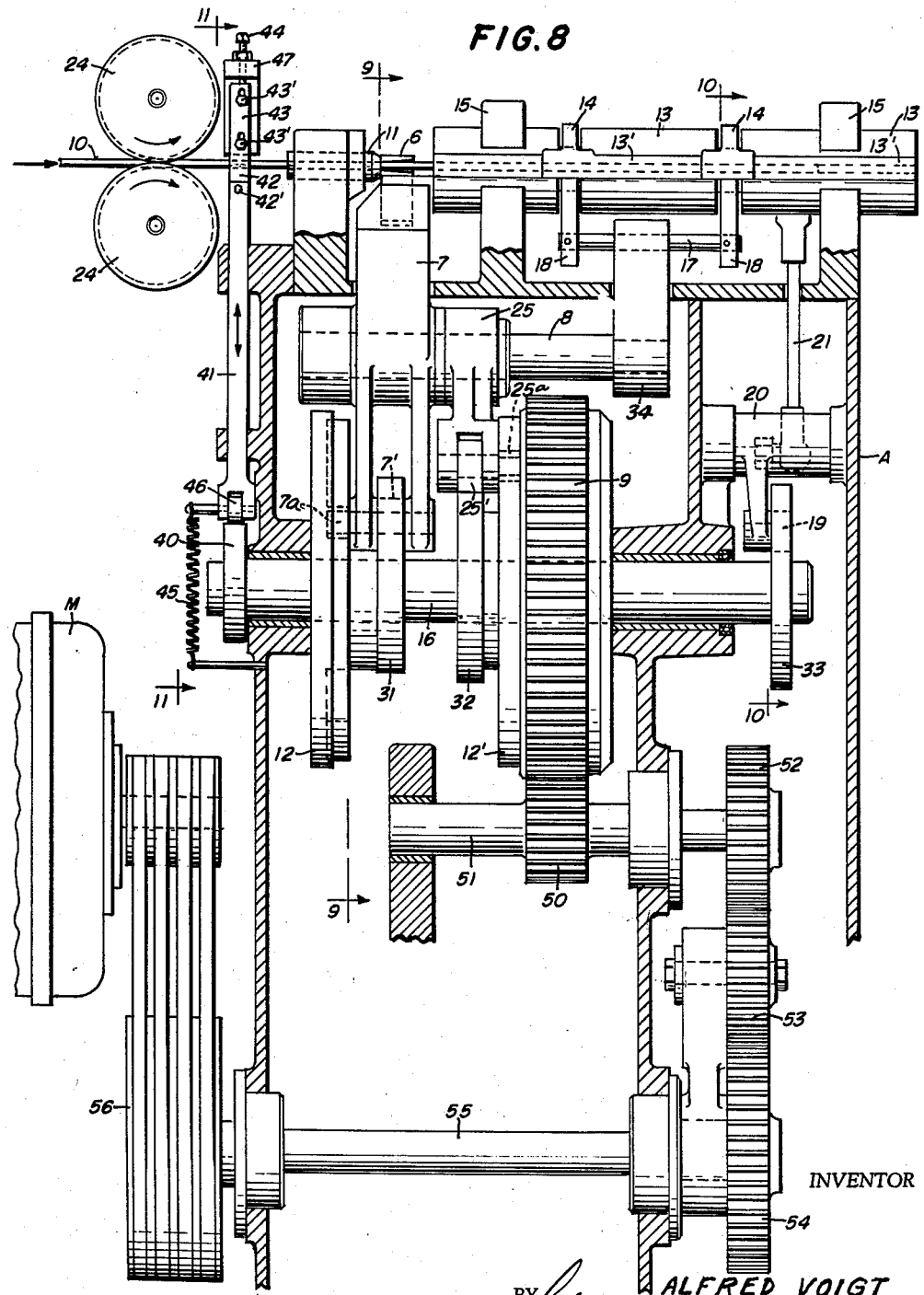

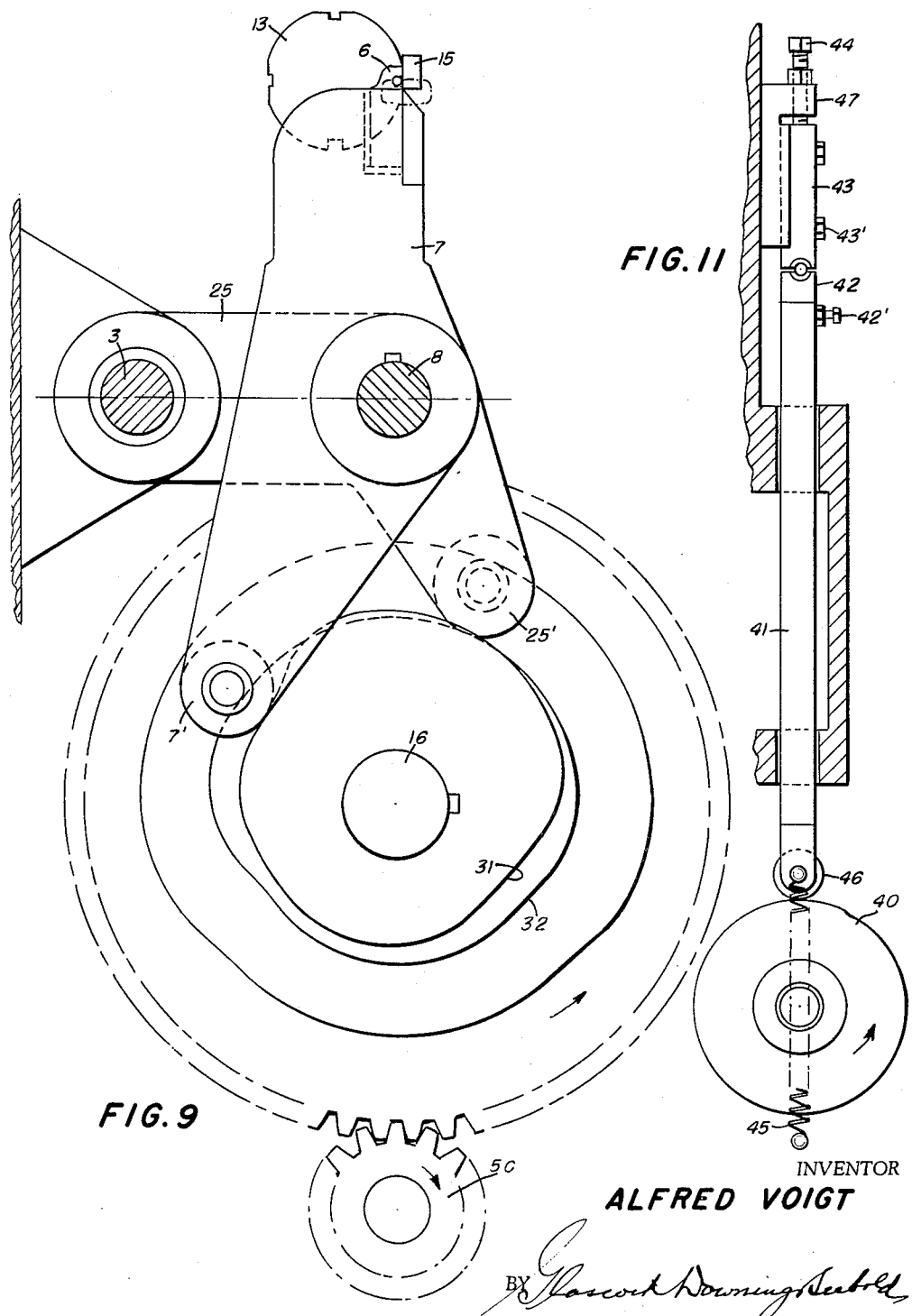

United States Patent Office 3,082,655
Patented Mar. 26, 1963

3,082,655
WIRE STRAIGHTENING AND CUT-OFF
MACHINES
Alfred Voigt, Bliesheimer Strasse 3,
Koln-Raderberg, Germany
Filed Jan. 8, 1960, Ser. No. 1,235
Claims priority, application Germany June 5, 1956
9 Claims. (Cl. 83—135)

This invention relates to wire straightening and cut-off machines in which wire is fed through straightening rolls to a cutting off station at which a knife is operated at timed intervals to cut off a predetermined length of wire.

In the known wire straightening and cutting-off devices of the prior art structures as diagrammatically illustrated in FIGS. 1 and 2, the cutting off lever 4 rockably journalled at C carries a shearing member in the form of a knife 5 which is intermittently moved across the end of a cutting off die 3a which guides the wire 1 and in so doing shears a desired length of wire. The cutting edge of the knife 5 must move across the whole cross section of the wire and then return to the starting position shown past the open end of die 3a. During this time which takes up a substantial part of the working cycle, the feed of the wire must be interrupted whereby the output of the machine per unit of time is undesirably reduced.

The present invention mitigates this disadvantage in a cutting off and ejecting device for wire straightening and cutting off machines by the knife being carried in a plane, closed, preferably oval or elliptical, path which passes approximately perpendicularly through the wire in the plane of the fixed cutting edge of the cutting off die.

The cutting off knife therefore only moves into the path of the wire during the very short cutting off operation and is then returned in a closed curve outside this path where it is temporarily halted so that feeding forward of the wire can take place during this return movement, whereby this part of the working cycle can be considerably shortened. The movement according to the invention of the knife along a closed preferably elliptical curve also brings the substantial advantage of a reduction in the inertia forces of the knife enabling the working speed to be increased.

The motion of the knife in accordance with the invention can be obtained in a simple manner by swinging the knife holder about two axes parallel to the axis of the cutting off die in dependence on the wire feed by means of suitable gearing.

For example, cams may be used having a timed relationship to means for interrupting the forward feed of the wire.

For cutting off short pieces of wire a particularly high number of cuts in unit time is necessary. In order to reduce the inertia forces arising at the knife still further it is proposed to drive the knife continuously, its average speed being such that a cut is effected each time the desired length of wire has been fed forward. If, however, longer pieces of wire are to be cut off it is advantageous to use a certain minimum cutting speed and then, in order to provide the necessary time for the forward feed of the pieces of wire, to couple the knife with the feed means in such a way that after each cutting off operation the knife remains briefly stationary. Thus it has been found that exceptionally smooth operation can be assured by coupling the knife with the feeding mechanism in such a way as to bring the knife to a short halt each time between two cutting operations.

The wire feed is so controlled that the wire is stopped in the operation of the machine during the passage of the knife. In order to decrease this period still further the knife may be tapered to reduce the distance it has to move after completion of the cut before it clears the opening in the cutting off die.

In the device according to the invention the time during which the wire feed is interrupted during each working cycle can be kept very short. In order to ensure the ejection of the cut off pieces of wire in this short time it is proposed according to the invention to provide separate ejector arms which are fixedly coupled with the cutting off lever and which engage cut off wire simultaneously with the knife. The ejector arms at the place of engagement may have a semi-circular recess fitting the wire cross section so that the wire is engaged with certainty.

It is therefore one object of the invention to provide a wire cutting machine which accurately cuts predetermined lengths of wire within a shorter time cycle than previous known devices.

A further object of the invention is to cut predetermined lengths of wire without bending the end of the wire out of shape.

Another object of the invention is to provide a machine for automatically feeding, cutting and ejecting predetermined lengths of wire within a short time cycle and without bending or burring the end of the wire.

It is still another object of the invention to feed a predetermined length of wire past a cutting station, arrest the wire only during the cutting operation, eject the predetermined length of wire immediately upon being cut, and feed another length before the knife returns to the cutting station.

The invention will be described by reference to an example diagrammatically illustrated in FIGURES 3 to 11 of the accompanying drawings.

FIGURE 8 is a view in elevation of the wire feeding, cutting and ejecting mechanism.

FIGURE 9 is a cross-sectional view taken along line 9—9 of FIGURE 8.

FIGURE 11 is an end view of the ejecting mechanism as shown along line 11—11 of FIGURE 8.

Figure 4:
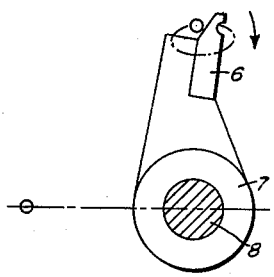
Figure 5:
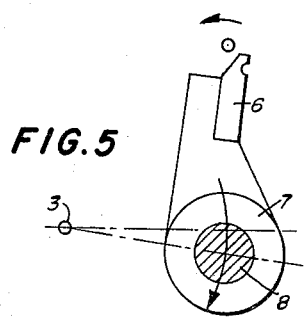
Figure 6:
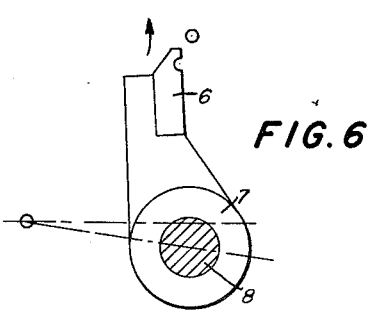
Figure 7:
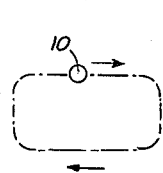
FIGURE 7 is a diagram showing the various positions of the cutting off knife during one cycle according to the invention.

The upwardly tapered cutting off knife 6, is secured to a cutting off lever 7 which is rockable about the axes 8 and 3, FIG. 5, whereby the approximately elliptical path of the knife shown in FIGURES 4 and 7 is produced.

Figure 1:
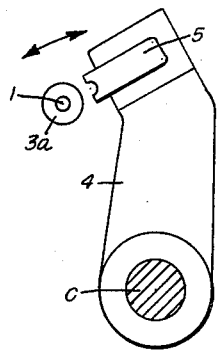
Figure 2:
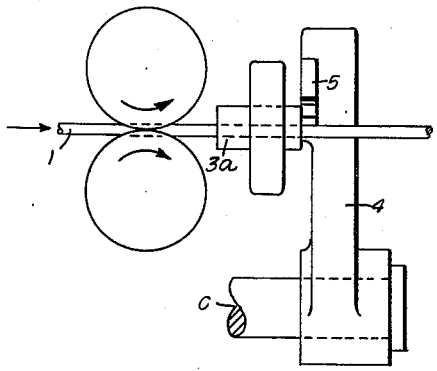
Figure 3:
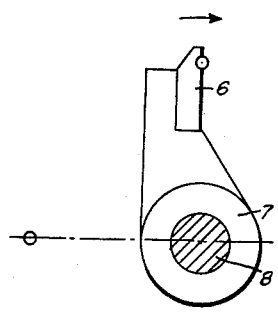
FIGURES 3 to 6 show the knife with the cutting off holder in different positions in relation to the wire end to be cut off in end view.

It will be understood that the axis 3 is fixed in relation to the position of the cutting off die and the axis 8 is arranged at the end of a lever pivoted on the axis 3 so that the axis 8 rises and falls about the axis 3 while the lever 7 swings about the axis 8. By suitable timing of these movements the elliptical path is achieved. The path taken by the cutting edge of the knife during one cycle is shown by the arrows in FIGURE 7. It will also be seen that by the upward tapering of the knife the knife only has to move a very short distance as shown in FIGURES 3 and 4, when it is rocking mainly about the axis 8 to cut off the wire and move clear of the opening in the cutting off die so that the wire feed can now recommence. During the rest of this movement the knife is clear of the opening in the die.

The wire 10, which is fed forward by known means here illustrated by a pair of feed rollers 24, FIGURE 8, which feed it in the direction of the arrow, is cut off by the action of the knife 6 across the end of the cutting off die 11 and is then ejected by the joint action of the knife and of ejecting levers 18 which swing with lever 7 out of the guide groove 13'.

The guide groove 13′ is provided in a member 13 cut away at 14 to clear the levers 18. This member is rotatable to bring any one of a number of guide grooves 13′ into position, these guide grooves differing in dimensions to suit different gauges of wire. There is a semi-circular recess in each lever 18 of a form to engage the wire securely. The guide groove 13′ ensures that the wire passes into these recesses as it is fed forward.

Figure 10:
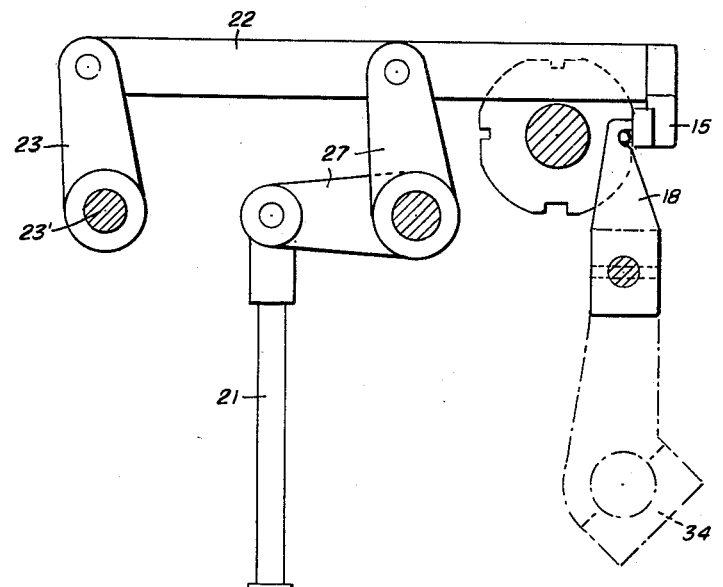
FIGURE 10 is a cross-sectional view taken along line 10—10 of FIGURE 8.

In order to carry out the operations of the knife as above described together with the feeding, arresting and ejecting of a predetermined length of wire, a mechanism such as shown in FIGS. 8, 9 and 10 has been provided, a description of which follows with direct reference to the drawing. The lever 7 which supports the knife 6 is mounted intermediate its ends on a shaft 8 which extends through the intermediate portion of a swing lever 25, one end of which is pivotally mounted to swing about a fixed axis 3. The end of the lever 7 opposite the knife carries a cam follower 7′ which rides on the periphery of the cam 31 and a second follower 7a riding within a groove in a return disc 12, both fixedly mounted on a shaft 16 journalled in the machine frame A. The free end of lever 25 carries a cam follower 25′ which rides on the periphery of a cam 32 also mounted for rotation with the shaft 16. Also carried by the free end of the lever 25 is a second follower 25a which rides in a groove in a return disc 12′ mounted on shaft 16 for rotation therewith. The shaft 16 is rotated by driving member 9 fixedly mounted thereon and which may take the form of a pulley or a gear driven from a motor. The ejecting levers 18 described above, are mounted on the two ends of a bar 17 carried at the upper end of an arm 34 which is fixed on the shaft 8 for both rotational and translational movement thereof.

During the cutting operation of the wire by the knife 6, portions of the forward ends of the recesses 13′ are covered by rigid rails 15 which depend from a bar 22 extending forwardly from the rear of the machine as shown in FIG. 10. The other end of the bar 22 is pivotally mounted on a swing-arm 23 mounted to swing about an axis 23′. The bar 22 is pivotally mounted intermediate its ends to a link 27 mounted on the upper end of a rod 21 which is connected at its other end to a triangular shaped lever 20 mounted to swing about an axis 20′. Carried by the lever 20 is a cam follower 19 engageable with the periphery of a cam 33 fixed on the shaft 16 for rotation therewith.

In operation, the wire 10 is drawn through a straightening device at the left of FIG. 8, not shown, by means of the two pairs of feed rolls, one such pair 24 being shown in FIG. 8. The wire passes through the cut-off die 11 at a constant speed until a predetermined point thereon arrives at the inner end of the die in the path of operation of the cutting-off knife, with the desired length of wire within the grooves 13′ and the groove in levers 18. At this moment, the forward feed of the wire is arrested by a wire clamping device 42, 43 to be described later. During the cutting operation, the cut-off knife is moved briefly across the wire and also checks the advance of the wire. Simultaneously with the start of the cutting-off operation, the covering rails 15 are actuated by means of cam 33 through lever 20, rod 21 and lever 22 so as to be moved away from in front of the recess 13′ to allow the two ejecting levers 18, which describe the same movement as and in a path similar to that of the cut-off knife 6, to eject the cut off piece of wire from the recess 13′.

The cams 31 and 32 together with the return discs 12 and 12′ are so designed that the edge of the knife 6 follows the path shown in dotted lines in FIG. 7 in the direction of the arrows. In the approximately horizontal parts of the path, the lever 7 is driven by the cam 31 while during the vertical parts the cam 32 controls the movement of the knife. During the rotation of the cams, the knife remains briefly at a standstill close to and at the left of the wire in FIG. 9, just before the start of the cutting operation. This is an essential part of the invention, since if the knife should strike the wire at high speed, the end of the wire would be bent out of shape. Another advantageous result flowing from interruption of the movement of the knife just before the cutting operation, resides in the fact that the acceleration of the knife, when just starting from a standstill is greatest, thus providing the greatest force at the necessary moment when the knife is cutting through the wire.

In order to obtain a straight and burr-free cut in the above described machine, the wire is clamped by members 42, 43 during the cutting operation and just prior to the cutting-off operation of the knife, in order to overcome the forward effect of the feed rollers 24. In order to operate the clamping shoes 42, 43 at the proper time during the operation of the machine in feeding and cutting predetermined lengths of wire, the lower clamping shoe 42 is secured to a pressure rod 41 by means of a bolt 42′. The lower end of the pressure rod carries a roller 46 engageable with the periphery of a cam 40 fixed to the shaft 16. The pressure rod 41 is mounted for sliding movement in openings provided in extensions of the frame of the machine as shown in FIG. 8. A spring 45 extending between a lateral extension of the pressure rod and an extension fixed on the frame biases the roller into engagement with the cam 40. An upper clamping shoe 43 is adjustably secured as by means of bolts 43′ to a block 47 which is fixedly mounted on the frame of the machine. A bolt 44 threadably mounted within the block 47 serves to adjust the upper clamping shoe 43 exactly with respect to the wire for sliding engagement with its periphery before the bolts 43′ are fully tightened, so that the wire will not suffer any bending or deformation because of the brief clamping. This adjustment must be carefully made, because at this time the wire is already straightened out satisfactorily.

The mode of operation of the clamping device is such that with the start of the cut-off operation of the wire perpendicularly to its axis by the knife 6 and against the cut-off bushing 11, the clamping cam 40 operates to raise the lower clamping shoe 42 and press the wire 10 against the upper shoe 43 so strongly that the feeding effect of the spring-pressured feed rollers 24 is overcome and the wire remains briefly stationary. Immediately after the cut is executed, the pressure effect against the wire is released due to the curve of the cam disc 40 and the downward pull of the spring 45 so that the forward feed of the wire becomes effective at once.

As stated above, rotation of the shaft 16 upon which the operating cams 31, 32, 33, 40 and return discs 12 and 12′ are keyed, is effected by means of driving member 9 secured to the shaft 16. As shown in FIG. 8, the driving member is in the form of a gear which is driven by a gear 50 mounted on a shaft 51 journalled in the frame A of the machine. The shaft 51 is in turn driven by a gear 52 mounted thereon and in mesh with an idler gear 53 driven by a gear 54 mounted on shaft 55 carrying a pulley 56 driven by a belt trained about a pulley mounted on motor M. Continued rotation of the motor M effects continuous rotation of shaft 16 so that the above-described cycle of operations of feeding, arresting, severing and ejecting predetermined lengths of wire is repeated as long as gear 9 is driven.

While I have disclosed a specific embodiment of my invention, it should be understood that it is well within the skill of the art to provide other embodiments which will perform the functions and produce the results which I have herein disclosed.

What is claimed is:

1. In a wire cutting machine, a stationary cut off die having an opening therethrough, means for feeding wire to extend through the opening, intermittently operative means engageable with the wire to arrest the feeding movement thereof, a cutting device having a knife, means mounting the cutting device for movement relative to the die opening, means for controlling the cutting device upon operation of the intermittently operable means to move the cutting device in a plane from a first position readily outward from but adjacent to the die opening in a first direction across the die opening to cut the wire and to a second position out of registry with the die opening, and in a second direction substantially perpendicular to the first direction and back to the first position while maintaining the cutting device out of registry with the opening, and mechanism for operating the intermittently operable means and the control means in timed relation to each other to permit feeding of the wire during return movement of the cutting device to the first position and to arrest the wire during cutting movements of the cutting device.

2. In a wire cutting machine according to claim 1, in which the intermittently operated means comprises clamping means engageable with the wire to arrest feeding movement thereof.

3. In a wire cutting machine according to claim 1, in which the means mounting the cutting device for movement relative to the die opening comprises a lever pivotally mounted at a fixed location, means pivotally mounting the cutting device on the lever and said controlling means includes a cam structure for moving the cutting device and lever in timed relation to each other.

4. In a wire cutting machine according to claim 1, including means for continuously operating said mechanism for repeating the cycle of operations.

5. In a wire cutting machine according to claim 1, in which the intermittently operated means comprises clamping means engageable with the wire to arrest feeding movement thereof, said clamping means including a fixed first clamping shoe slidably engageable with the periphery of the wire, a second clamping shoe positioned diametrically opposite to the first clamping shoe, and means movably supporting said second clamping shoe for movement radially of the wire to move it against said first clamping shoe.

6. In a wire cutting machine according to claim 5, including means for radially adjusting the first clamping shoe with respect to the axis of the wire.

7. In a wire cutting machine, a stationary cut off die having an opening therethrough, means for feeding wire to extend through the opening, intermittently operative means to arrest the feeding movement of the wire, a cutting device having a knife, means positioned in the path of the extending wire for supporting it horizontally over a substantial portion of its length, means for ejecting the wire from the support, means mounting the cutting device for movement relative to the die opening, means for controlling the cutting device upon operation of the intermittently operable means to move the cutting device in a plane from a first position radially outward from but adjacent to the die opening in a first direction across the die opening to cut the wire and to a position out of registry with the opening, means operable concurrently with the controlling means for ejecting the cut length of wire from the support, means for returning the cutting device in a path out of registry with the die opening to the first position and stopping it at said first position, and means for rendering the arresting means operative during cutting movements of the cutting device and inoperative during return movement of the cutting device to permit feeding a further length of wire to the support means.

8. In a wire cutting machine according to claim 7, in which the supporting means includes a member having an outwardly open groove in its surface concentric with the axis of the die opening and a covering rail for the groove mounted for movement adjacent the surface.

9. In a wire cutting machine according to claim 8, in which said rail is normally positioned to cover the open groove during feeding movement of the wire, and means operated concurrently with the ejecting device for moving the covering rail out of the path of the ejected wire.

References Cited in the file of this patent

UNITED STATES PATENTS

| | | |
|---|---|---|
| 1,714,480 | Thacher | May 21, 1929 |
| 2,446,305 | Sandberg | Aug. 3, 1948 |
| 2,575,417 | Heyman | Nov. 20, 1951 |
| 2,930,268 | Neptune | Mar. 29, 1960 |

FOREIGN PATENTS

| | | |
|---|---|---|
| 456,515 | Germany | Feb. 25, 1928 |
| 202,423 | Austria | Mar. 10, 1959 |